F. J. LEMLEY.
FRICTION CLUTCH.
APPLICATION FILED OCT. 23, 1908.
911,415.
Patented Feb. 2, 1909.
2 SHEETS—SHEET 1.
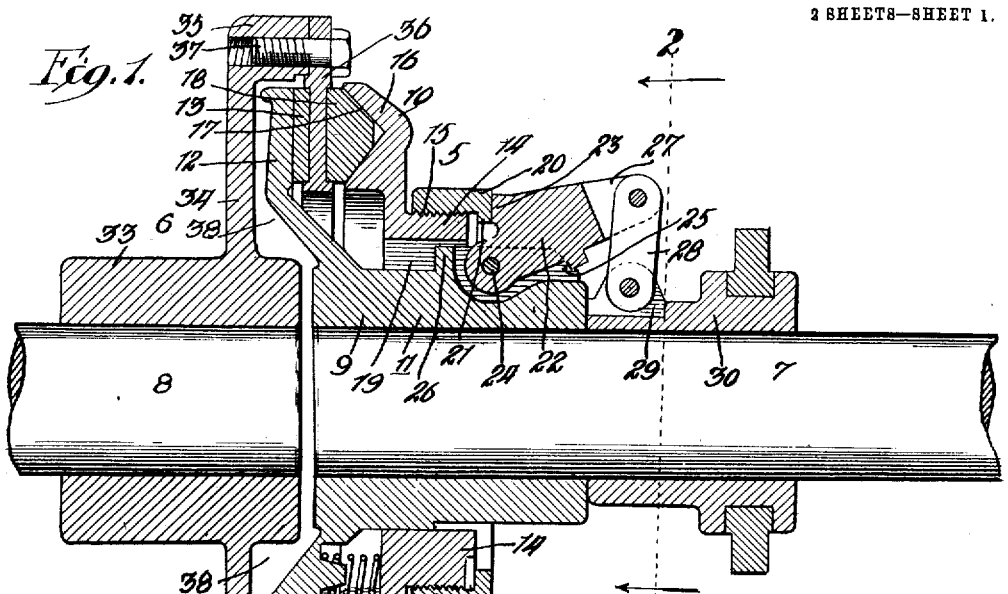
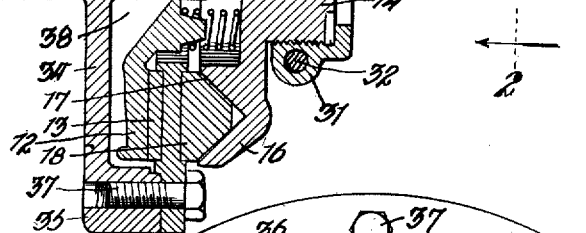
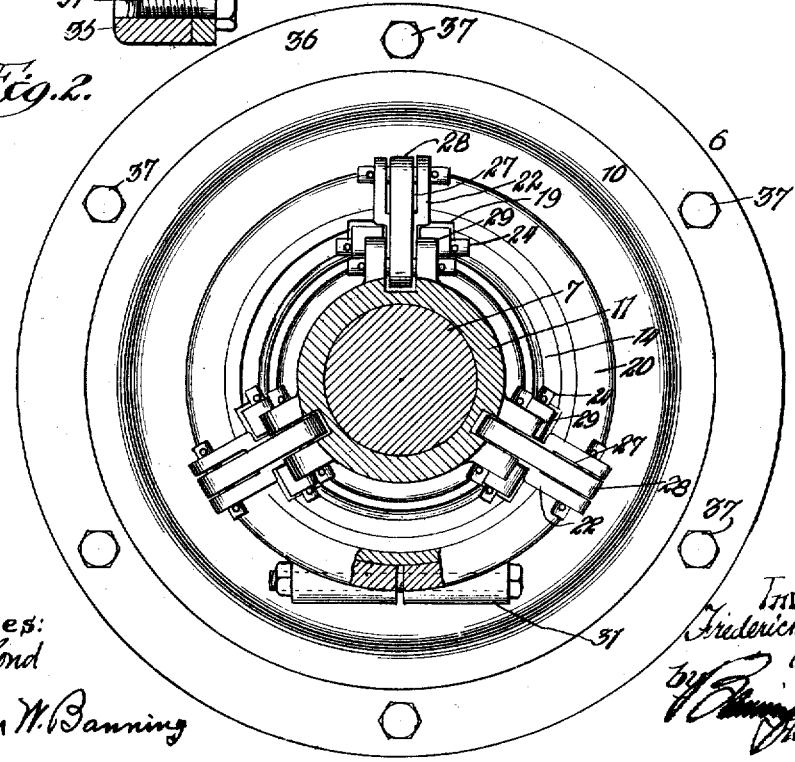
Witnesses:
Inventor:
Frederick J. Lemley

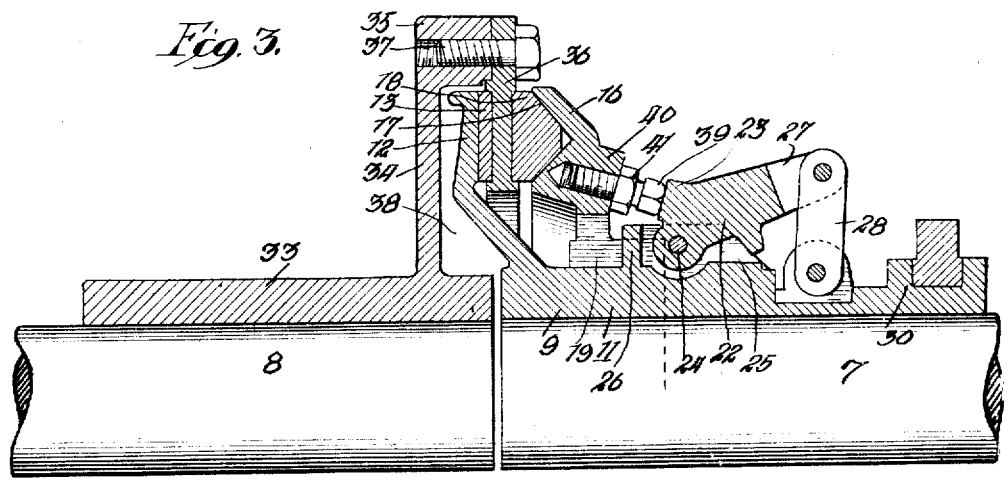
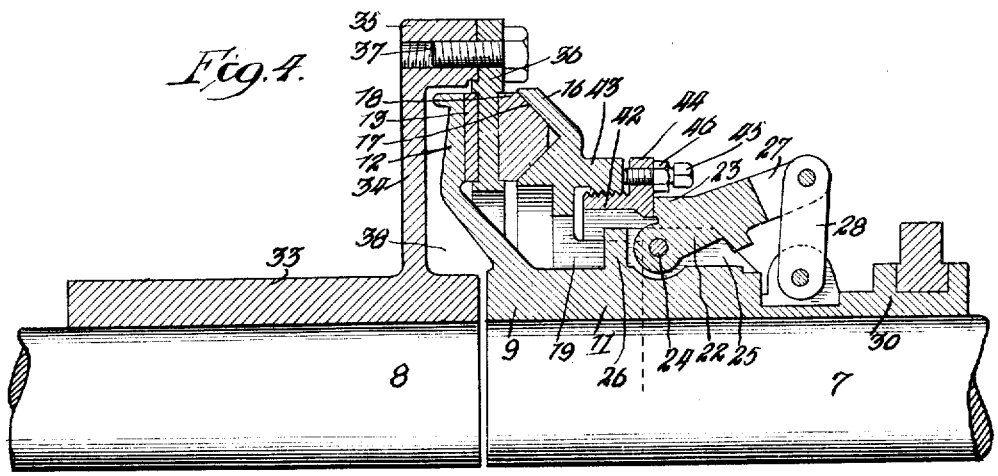

UNITED STATES PATENT OFFICE.

FREDERICK J. LEMLEY, OF CHICAGO, ILLINOIS.

FRICTION-CLUTCH.

No. 911,415.  Specification of Letters Patent.  Patented Feb. 2, 1909.

Application filed October 23, 1908. Serial No. 459,127.

*To all whom it may concern:*

Be it known that I, FREDERICK J. LEMLEY, a citizen of the United States, residing at Chicago, in the county of Cook and State of Illinois, have invented certain new and useful Improvements in Friction-Clutches, of which the following is a specification.

This invention relates particularly to friction clutches of the type ordinarily employed in connection with sections of shafting, or in connection with the transmission of power through pulleys, gearing, etc.

In clutches of this character it is desirable to provide means for regulating the throw of the movable clutch member, and the present invention more particularly relates to the means provided for adjusting the clutch in such manner that the regulation will be uniform on all sides of the movable clutch member, thereby equally distributing the strain and enabling the adjustment to be made in an easy and convenient manner.

Other objects of the invention are to so construct the parts that the clutch will be strong and durable and at the same time easy to assemble and convenient to operate.

Further objects will appear from a detailed description of the invention, which consists in the features of construction and combination of parts hereinafter described and claimed.

In the drawings Figure 1 illustrates two sections of shafting, showing a longitudinal section of the preferred form of the present invention; Fig. 2 a cross sectional view taken on line 2—2 of Fig. 1; Fig. 3 a longitudinal section, showing a modified form of the clutch; and Fig. 4 a similar view, showing a second modification.

According to Figs. 1 and 2, the clutch comprises an active member 5 and a coacting member 6, applied, respectively, to shaft sections 7 and 8. The active member, which embodies the essential features of the present invention, consists of a fixed section 9 and a movable section 10. The fixed section is in the form of a sleeve 11 having, at its inner end, an outwardly projecting web or flange 12, which carries a clutch ring 13 of wood, leather or other suitable frictional substance. The movable member 10 is in the form of a collar 14 provided, around its periphery, with screw threads 15; which collar has outwardly extending therefrom a flange 16 provided with a beveled recess 17 on its inner face, which recess carries a ring shaped clutch block 18 of wood, leather or similar material, which block is beveled on its rear face to register with the beveled surface of the recess within which it is carried. The collar 14, at suitable equi-distant points, is provided, on its inner face, with slots 19, the function of which will hereafter appear; and the periphery of the collar has screwed thereonto an adjusting ring 20, provided on its outer edge with an inwardly extending flange 21 affording a suitable bearing surface for the toggles 22, which may be of any suitable number, as, for instance, 3, depending upon the character of the work to which the clutch is subjected.

Each of the toggles is provided with a thumb 23, which contacts with the flanged end of the adjustable ring 20; and the toggles are pivoted through their inner ends by means of pivot pins 24. The pivoted ends of the toggles lie between flanges 25, which outwardly project from the hub 11, which hub, intermediate the flanges, is recessed to provide a suitable clearance for the operation of the toggles. The flanges 25, which extend longitudinally of the hub, are connected at their inner ends by a cross flange 26, which serves to reinforce the side flanges and strengthen the construction immediately adjacent the pivotal mounting for each of the toggles. Each of the toggles is bifurcated at its outer end 27, to receive a link 28, which link is pivoted in ears 29 on a slidably grooved clutch collar 30 of the usual character. In order to provide for the easy regulation of the adjustable ring 20, the latter is in the form of a split ring, provided, adjacent to the split ends, with lugs 31, through which is entered a screw bolt 32, which permits the ring, after adjustment, to be clamped tightly onto the screw threads 15 of the collar 14, so that when the split adjusting ring is clamped in place the construction will be, in effect, an integral one, and the threads will be relieved from strain during the operation of the clutch.

The movable or active portion of the clutch previously described, coöperates with the coacting clutch member 6, which, as shown, is in the form of a hub 33, having a web 34 outwardly projecting therefrom, which web is provided, around its periphery, with an inwardly extending flange 35, carrying a ring shaped contact plate 36 which is secured to the flange by means of bolts 37, a suitable space 38 being afforded intermediate the plate and the web 34, for the reception of the web or flange 12 on the acting portion of the clutch. The plate 36 is preferably recessed on each side to provide for the reception of the clutch blocks.

Fig. 3 shows a slightly modified form of construction in which, in place of the adjustable ring hitherto described, a plurality of set screws 39 are provided, which are entered into a boss 40, formed on the rear face of the flange 16, which set screws are adapted to be locked by means of jam nuts 41 of the usual type. In other respects the construction is substantially identical with that previously described.

In the modification shown in Fig. 4 an adjusting ring 42 is employed, which is similar to that previously described, save only that it is threaded on its outer surface instead of its inner surface, and is entered within a collar 43, and not outside of the collar like that shown in Fig. 1. Moreover, the adjusting ring of Fig. 4 is provided with a flange 44 having a set screw, or set screws 45 entered therethrough, the ends of which set screws bear against the edge of the collar 43 and serve, when tightened, to lock the threads of the collar, thereby performing the same function that is performed by the screw bolt 32 in the construction shown.

Jam nuts 46 are provided, in the construction of Fig. 4, to lock the set screws in adjusted position. Other features of construction, illustrated in Fig. 4 are substantially the same as the construction previously described, so that further description is deemed unnecessary.

In all of the constructions the mode of operation of the clutch is substantially the same. When the grooved clutch collar is moved inwardly the links will be moved to a position which distends the free ends of the toggles, thereby causing the thumbs on the toggles to press against the adjustable contact surface provided therefor, which pressure, will be equally applied to all sides of the movable clutch member, thereby moving the collar, and with it the clutch block 18, which will be brought into tight engagement with the coacting plate 36, and the two blocks, acting in opposition to one another, will engage the plate on opposite sides, and thereby set the clutch. The hubs of the active and passive clutch members are, of course, keyed onto the respective sections, but the movable clutch collar 14 need not be keyed to the hub 11, since the flanges 25, operating within the slots 19, serve to hold the fixed and movable portions of the active clutch member in coöperating relation with one another, so that there will be no loss in the transmission of torsional effort, and at the same time the slots 19 act as suitable guideways for the longitudinal movement of the movable member of the active clutch section. In adjusting the throw of the toggles, the adjusting rings of either of the forms of construction, employing rings, can be regulated, and thereafter locked, which brings the contact surface for the toggles, either toward or from their pivotal mountings, so that a very substantial adjustment is provided. The same result is accomplished in the construction of Fig. 3 by regulating the set screws and locking them with the jam nuts. The construction is one which permits easy assembling of the parts, and the various portions of the clutch as a whole, can be strongly and durably manufactured, which gives great strength and efficiency to the completed clutch.

What I regard as new and desire to secure by Letters Patent is:

1. In a clutch, active and passive members, the active member comprising fixed and movable sections, each carrying clutch blocks adapted to engage the passive member, toggles on the fixed section of the active member, and an adjustable member in the form of a split screw threaded ring screwed onto the movable member of the active clutch section and adapted to be clamped in adjusted position, substantially as described.

2. In a clutch, the combination of active and passive members, the active member comprising a fixed section in the form of a hub provided with a flange or web carrying a clutch contact block, said hub being provided with flanges arranged in pairs, toggles pivoted between the flanges, and a movable section provided with slots registering with said flanges, said movable section carrying a clutch contact block, and adjustable means carried by the movable member to afford a contact for the toggles, substantially as described.

3. In a clutch, the combination of active and passive members, the active member comprising a fixed section in the form of a hub provided with a flange or web carrying a clutch contact block, said hub being provided with flanges arranged in pairs, toggles pivoted between the flanges, and a movable section provided with slots registering with said flanges, said movable section carrying a clutch contact block, and a ring screw threaded to the movable member and affording a contact surface for the toggles, substantially as described.

4. In a clutch, the combination of active and passive members, the active member comprising a fixed section in the form of a hub provided with a flange or web carrying a clutch contact block, said hub being provided with flanges arranged in pairs, toggles pivoted between the flanges, and a movable section provided with slots registering with said flanges, said movable section carrying a clutch contact block, and a split ring screw threaded to the movable member and affording a contact surface for the toggles, and means for clamping the split ring in adjusted position, substantially as described.

5. In a clutch, the combination of active and passive members, the active member comprising a fixed section in the form of a hub provided with a flange carrying a clutch contact block, the hub being provided at suitable intervals with longitudinally extending flanges, toggles pivoted to the flanges, and a movable clutch section in the form of a collar provided with slots adapted to receive the flanges, clutch contact blocks carried by said collar, and a ring screw threaded onto said collar and affording a contact surface for the toggles, substantially as described.

6. In a clutch, the combination of active and passive members, the active member comprising a fixed section in the form of a hub provided with a flange carrying a clutch contact block, the hub being provided at suitable intervals with longitudinally extending flanges, toggles pivoted to the flanges, and a movable clutch section in the form of a collar provided with slots adapted to receive the flanges, clutch contact blocks carried by said collar, and a split ring screw threaded to said collar and affording a contact surface for the toggles, and means for clamping said split ring in adjusted position, substantially as described.

7. In a clutch, the combination of active and passive members, the active member comprising a fixed section in the form of a hub provided with a flange carrying a clutch contact block, the hub being provided at suitable intervals with longitudinally extending flanges, toggles pivoted to the flanges, and a movable clutch section in the form of a collar provided with slots adapted to receive the flanges, clutch contact blocks carried by said collar, and a split ring screwed onto the exterior of said collar and provided with a screw bolt for clamping the free ends of said split ring together, substantially as described.

FREDERICK J. LEMLEY.

Witnesses:
 WALKER BANNING,
 PIERSON W. BANNING.